(12) United States Patent
Bruno et al.

(10) Patent No.: US 8,533,811 B2
(45) Date of Patent: Sep. 10, 2013

(54) DEVELOPER PHONE REGISTRATION

(75) Inventors: John Bruno, Snoqualmie, WA (US); Michael Saffitz, Seattle, WA (US); Kenneth D. Ray, Seattle, WA (US); Geir Olsen, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 12/853,608

(22) Filed: Aug. 10, 2010

(65) Prior Publication Data

US 2011/0177792 A1 Jul. 21, 2011

Related U.S. Application Data

(60) Provisional application No. 61/296,621, filed on Jan. 20, 2010.

(51) Int. Cl.
*G06F 7/04* (2006.01)
(52) U.S. Cl.
USPC ............................................ 726/17; 713/175
(58) Field of Classification Search
USPC ................................................. 713/155–159
See application file for complete search history.

(56) References Cited

U.S. PATENT DOCUMENTS

| | | | |
|---|---|---|---|
| 5,655,004 A | 8/1997 | Holbrook | |
| 7,536,356 B2 * | 5/2009 | Eng | 705/59 |
| 7,797,545 B2 * | 9/2010 | Adams et al. | 713/179 |
| 7,996,911 B2 * | 8/2011 | Yoshida et al. | 726/26 |
| 8,086,233 B2 * | 12/2011 | Millet et al. | 455/435.1 |
| 8,126,963 B1 * | 2/2012 | Rimmer | 709/203 |
| 8,200,790 B1 * | 6/2012 | Reeves et al. | 709/220 |
| 2002/0078380 A1 * | 6/2002 | Lin et al. | 713/201 |
| 2003/0134615 A1 | 7/2003 | Takeuchi | |
| 2003/0149669 A1 * | 8/2003 | Howells et al. | 705/51 |
| 2004/0025022 A1 * | 2/2004 | Yach et al. | 713/176 |
| 2004/0117615 A1 * | 6/2004 | O'Donnell et al. | 713/155 |

(Continued)

FOREIGN PATENT DOCUMENTS

| | | |
|---|---|---|
| WO | 2005/109360 A1 | 11/2005 |
| WO | WO 2005109360 A1 * | 11/2005 |

OTHER PUBLICATIONS

Apple Inc., iPhone Development Guide, Development Environments: Xcode, Aug. 6, 2009.*

(Continued)

*Primary Examiner* — Jeffrey Pwu
*Assistant Examiner* — Carolos Amorin
(74) *Attorney, Agent, or Firm* — Vierra Magen Marcus LLP

(57) ABSTRACT

A technique allows software developers to develop applications for a smart phone or other terminal by unlocking the terminal so that it can run unsigned applications. A developer registers with a web-based service, agrees to registration terms, and provides authentication credentials. Data which verifies the authentication credentials is provided back to the developer's computer. The terminal is connected to the developer's computer, and via a user interface, the developer requests registration of the terminal. In response, the terminal receives the data from the developer's computer, and provides the data and a unique terminal identifier to the service. If authorized, the service returns a persistent token or license which is stored at, and used to unlock, the terminal. The service can also provide a command which enforces an expiration date. The terminal checks in with the service to determine if the account is in good standing, and is re-locked if warranted.

17 Claims, 12 Drawing Sheets

(56) References Cited

U.S. PATENT DOCUMENTS

| | | | |
|---|---|---|---|
| 2004/0143746 A1* | 7/2004 | Ligeti et al. | 713/185 |
| 2004/0181672 A1* | 9/2004 | Ferri et al. | 713/176 |
| 2005/0005131 A1* | 1/2005 | Yoshida et al. | 713/183 |
| 2005/0210459 A1* | 9/2005 | Henderson et al. | 717/168 |
| 2006/0002556 A1 | 1/2006 | Paul | |
| 2006/0053291 A1* | 3/2006 | Brown et al. | 713/175 |
| 2007/0101167 A1* | 5/2007 | Lindley et al. | 713/300 |
| 2008/0274716 A1* | 11/2008 | Fok et al. | 455/410 |
| 2009/0165111 A1* | 6/2009 | Zhang et al. | 726/9 |
| 2009/0172412 A1* | 7/2009 | Fascenda et al. | 713/189 |
| 2009/0210702 A1* | 8/2009 | Welingkar et al. | 713/156 |
| 2009/0228704 A1* | 9/2009 | de Atley et al. | 713/156 |
| 2009/0249071 A1* | 10/2009 | De Atley et al. | 713/171 |
| 2010/0083386 A1* | 4/2010 | Kline et al. | 726/34 |
| 2010/0223672 A1* | 9/2010 | Maher et al. | 726/26 |
| 2010/0250946 A1* | 9/2010 | Korte et al. | 713/175 |
| 2010/0332848 A1* | 12/2010 | Adams et al. | 713/189 |
| 2011/0055606 A1* | 3/2011 | Wu et al. | 713/323 |
| 2011/0099376 A1* | 4/2011 | Gupta et al. | 713/171 |
| 2011/0125875 A1* | 5/2011 | Matsui | 709/219 |
| 2011/0145928 A1* | 6/2011 | Tsuboi | 726/26 |
| 2011/0154130 A1* | 6/2011 | Helander et al. | 714/48 |
| 2011/0154439 A1* | 6/2011 | Patel et al. | 726/3 |
| 2011/0161663 A1* | 6/2011 | Nakhjiri | 713/158 |
| 2012/0124382 A1* | 5/2012 | Little et al. | 713/176 |
| 2012/0174200 A1* | 7/2012 | Cross et al. | 726/6 |
| 2012/0179917 A1* | 7/2012 | Yach et al. | 713/189 |
| 2012/0304311 A1* | 11/2012 | Kline et al. | 726/28 |

OTHER PUBLICATIONS

Jurgen Niinre, Authentication and Digital Signatures with Mobile Phone, Oct. 12, 2009, http://www.epractice.eu/en/cases/mobileid.

Apple Inc., iPhone in Business Digital Certificates, Jun. 2009, http://images.apple.com/iphone/business/docs/iPhone_Digital_Certificates.pdf.

Mannan, et al., Using a Personal Device to Strengthen Password Authentication From an Untrusted Computer, School of Computer Science, Carleton University, Ottawa, Canada, Mar. 2007, http://www.scs.carleton.ca/research/tech_reports/2007/download/TR-07-11.pdf.

Uzun, et al., Usability Analysis of Secure Pairing Methods, Nokia Research Center Technical R, eport NRC-TR-2007-002, Jan. 2007, http://usablesecurity.org/papers/uzun.pdf.

Aladdin, Strong Authentication: Securing Identities and Enabling Business, Jan. 26, 2006, http://www.crn.in/Resources/Docs/Aladdin_1208446979966_WP_eToken_StrongAuth.pdf.

Chinese Office Action dated Apr. 3, 2013, Chinese patent Application No. 201110031352.X.

* cited by examiner

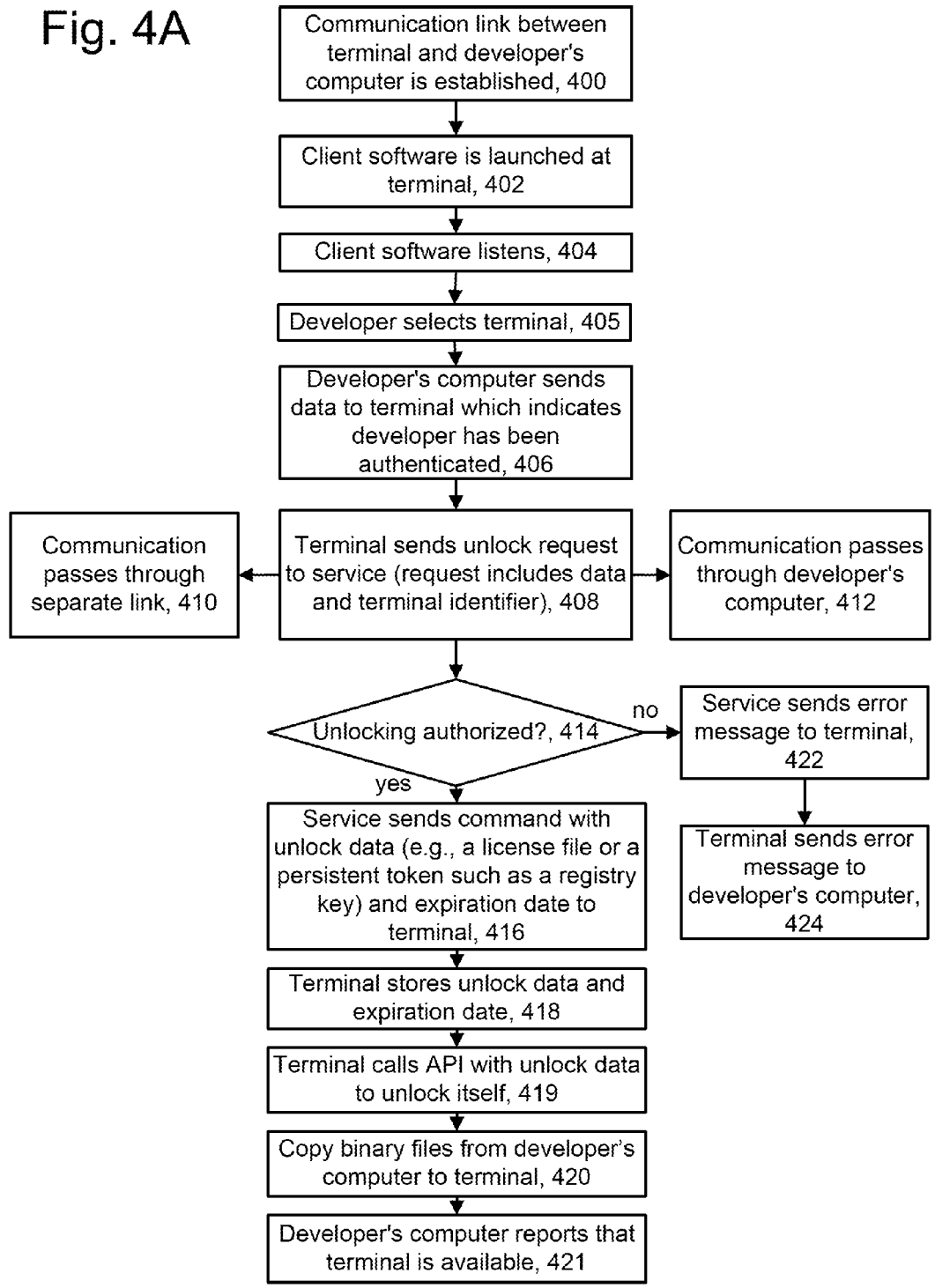

Fig. 4F    470

Account information:    472

Developer profile
Business details
Payment information
Terminal manager

My unlocked terminals, 474

Number of unlocked terminals: 3
Maximum allowed: 5

| Terminal name: | terminal identifier: | Unlock expiration: | Action: |
|---|---|---|---|
| HTC Touch Pro2 | id1 | 10/2/2010 | Remove |
| Samsung i907 | id2 | 10/2/2010 | Remove |
| HP IPAQ 910c | id3 | 10/2/2010 | Remove |

Cancel, 476     Save, 478

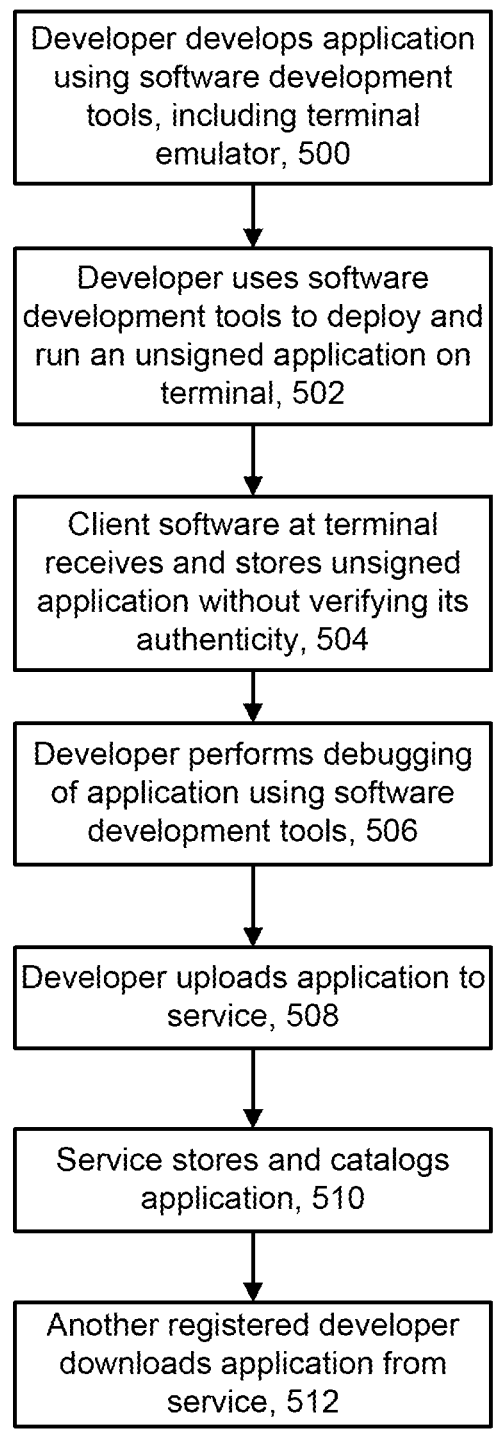

DEVELOPER PHONE REGISTRATION

CROSS-REFERENCE TO RELATED APPLICATIONS

This application claims the benefit of U.S. provisional patent application No. 61/296,621 filed Jan. 20, 2010, and incorporated herein by reference.

BACKGROUND

Portable terminals such as smart phones have become increasingly popular due to their ability to run third-party applications which are typically downloaded to the terminal from a web site for free, or upon payment of a small fee. Such applications can include games, programs that take advantage of geographical location services, educational applications, and so forth. Terminal manufacturers encourage the development of these applications by making software development tools available to software developers. Such tools may include a terminal emulator, which simulates the functionality and performance of the terminal, as well as tools for deploying, executing, debugging and sharing applications prior to the commercial release of the application. In most cases, the application is tested on the terminal itself before its release. However, terminals are commonly shipped so that applications can be deployed and executed only from approved, e.g., trusted or authorized, sources. Developers register with the manufacturer and submit their finalized applications to the web site of the manufacturer, where the applications are reviewed and approved for distribution. When a developer downloads an application to a terminal, the application is cryptographically signed with a digital signature, and the terminal verifies that the application is approved using a signature verification mechanism, before allowing the application to run.

However, the use of such authentication mechanisms in the development process can make the work of the software developer more difficult. Commonly, the authentication mechanism is a complicated and error-prone certificate-based authentication mechanism that requires the developer to manage the relationship between the terminal and their computer, which runs the software development tools. On the other hand, if the developer is granted an unrestricted ability to deploy and run applications on the terminal, this makes it easier for unauthorized applications to be loaded and run, e.g., using application side-loading, so that piracy is facilitated. Moreover, a management challenge is posed when a developer uses different computers to run software development tools for different terminals. There is a one computer-to-many terminal management challenge, a many computers-to-one terminal management challenge and a many computers-to-many terminals management challenge.

SUMMARY

Techniques are provided for permitting an authenticated, registered software developer to register a smart phone or other terminal with a service such as a web-based service. Once the terminal is registered, it becomes activated for deployment, execution, debugging and sharing of unsigned applications, e.g., applications which do not include a cryptographic signature. The registration of the terminal can be tied to duration of the developer's registration.

The terminal may be a smart phone, which is a mobile phone or cell phone which has advanced capabilities and provides features which are similar to a personal computer (PC). Typically, a smart phone runs operating system software providing a standardized interface and platform for application developers. Features such as e-mail, Internet access, e-book reader capabilities, on-screen or physical keyboard and a cable connector are often provided. More generally, the terminal may be any type of terminal which has network connectivity and an application platform, where distribution of the application needs to be controlled. The terminal is connected, e.g., via a cable or wireless link, to a developer's computer, which runs software development tools. The software development tools provide a user interface which allows the developer to select and register the terminal.

In one embodiment, a processor-implemented method is executed by one or more servers for managing a terminal which has a network communication capability. The one or more servers provide a service to application developers. The method includes receiving registration information from a developer for registering as a software developer to develop applications for the terminal. The developer may pre-register some time before the developer is ready to deploy an application to the terminal, or may register in conjunction with deploying an application to a terminal. The registration information includes a developer identifier, e.g., developer name or e-mail address, and developer authentication information/credentials, e.g., password. The one or more servers store the registration information in an account. The one or more servers send data to the developer's computer which indicates that the developer has been authenticated by the one or more servers. The developer's computer provides the data to the terminal via a communication link which is established between the terminal and the developer's computer. This can be performed automatically, without user intervention, or in response to a command entered by the developer via a user interface at the developer's computer.

Subsequently, the terminal initiates a communication with the server. The server receives from client software running on the terminal, a request to unlock the terminal, where the request includes the data and an identifier of the terminal. The service associates the data with an account of the developer and authorizes the unlocking if permitted. The service may check to ensure that the account has not been revoked and that a maximum allowable number of unlocked terminals for the account will not been exceeded. Based on the request and the registration information, if the unlocking of the terminal is authorized, the one or more servers send a command to unlock the terminal to the terminal, in response to which an unlocked state is persisted (maintained) in the terminal. The command can include, e.g., a license file or a persistent token, e.g., an encrypted identifier such as a registry key, along with an expiration date. The terminal persists the unlocked state until the expiration date.

The unlocked state allows unsigned applications which are developed by software development tools to be deployed and executed on the terminal. In the unlocked state, the registered developer or any other person, registered or unregistered, can freely and repeatedly deploy different builds or versions of one or more unsigned applications to the terminal, so that the applications are deployed and run without their digital signatures being validated, in one possible approach. This approach greatly facilitates the speed at which the developer can work as the developer is freed from managing a relationship between the terminal and the developer or developer's computer and the associated authentication mechanism. An optimal balance is provided between a highly secure approach, which requires all applications to be authenticated before being deployed and run, and an open access approach, which allows any unsigned application to run, without requiring any developer or terminal registration.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 4A depicts further details of step 210 of FIG. 2, in which a developer registers one or more terminals with a service of a developer portal to unlock the one or more terminals.

FIG. 4F depicts an example user interface associated with step 421 of FIG. 4A which provides a report indicating all terminals associated with a developer account which have been unlocked.

FIG. 5 depicts further details of step 220 of FIG. 2, in which an application is deployed and run on an unlocked terminal.

DETAILED DESCRIPTION

A terminal such as a smart phone, a service for software developers to develop applications for the terminal, and a developer's computer which runs software development tools/code for the terminal, are provided. The developer, e.g., a user/person, is enabled to easily deploy and run applications on one or more terminals using a streamlined registration and terminal-unlocking process. Once unlocked, applications can be freely and directly deployed and run, in one possible approach. However, the developer remains responsible for the terminals as they are linked to the developer's registration account. Moreover, the developer is limited in the number of terminals which can be unlocked and accessed according to a registration agreement. Further, the terminals can be deregistered if the developer violates a registration agreement. The terminals periodically check in with the service to determine if the account is in good standing, in response to which the service can provide a lock command to a terminal, if warranted.

Figure 1:
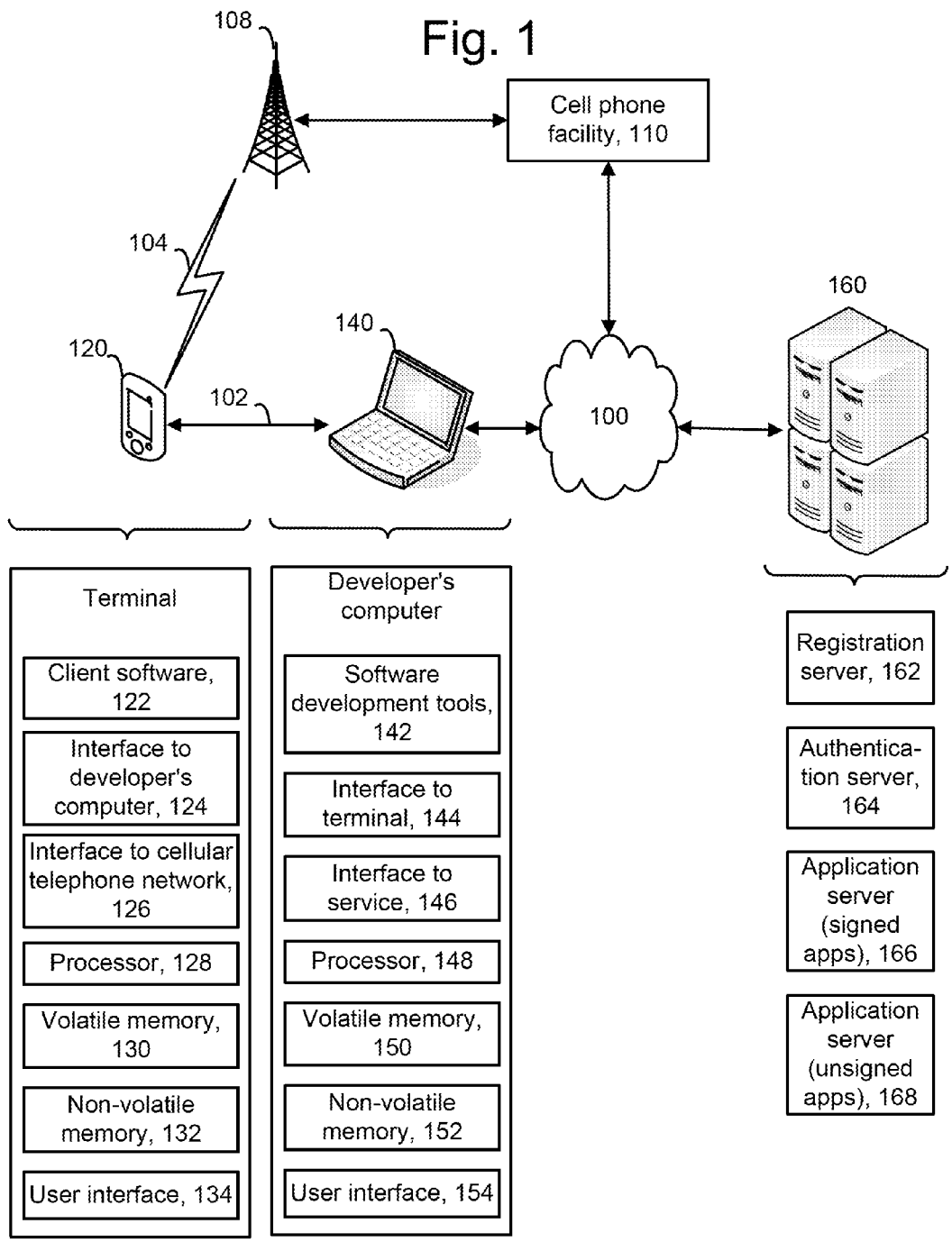
FIG. 1 depicts a network which includes a developer's computer, a terminal on which an application is to be deployed, and one or more servers of a developer portal.

FIG. 1 depicts a network which includes a developer's computer, a terminal on which an application is to be deployed, and one or more servers of a developer portal. In this example, the terminal 120 for which the deployment of applications is to be managed is a smart phone. Examples of smart phones include phones which run operating systems such as WINDOWS MOBILE®, iPHONE OS®, ANDROID®, SYMBIAN OS®, PALM WebOS®, BLACKBERRY OS®, SAMSUNG BADA® and MAEMO®. However, the concepts provided herein can be used with any type of terminal which has network connectivity and an application platform, where it is desirable to control distribution of applications to the terminal while encouraging third-party developers to build the applications. Typically, the terminal will also have a unique identifier. Other examples of such terminals could include portable media players such as APPLE iPOD® and MICROSOFT ZUNE®, surface computing platforms such as MICROSOFT SURFACE™, tablet PCs, home appliances such as network-enabled televisions, gaming devices such as MICROSOFT XBOX®, personal digital assistants (PDAs) or palmtop computers, Enterprise Digital Assistants (EDAs) which are used for data collection in business applications, GPS devices, and so forth. It is also possible for the terminal to have a standard PC operating system on which applications are deployed using a third-party development model. Thus, the terminal can be a PC. The terminal can be a mass produced device which is purchased from a retailer, or it can be a custom made device.

The terminal 120 as a smart phone can communicate via a wireless cell phone link 104 with an antenna 108 which is in communication with a cell phone facility 110. The facility 110, in turn, may communicate with one or more networks 100, e.g., a wide area network such as the Internet and/or an intranet, and with one or more servers 160 of a service which enables software developers to access terminals to develop their applications through deploying, executing, debugging and sharing. The terminal 120 can also communicate with the one or more servers via the developer's computer 140. To register the terminal 120, a communication link 102 is established between the terminal and the developer's computer 140, on which software development tools run. For example, the link 102 may be a cable (tether) which extends between a connector of the terminal and a connector of the developer's computer 140. Alternatively, a wireless link such as via Wi-Fi (IEEE 802.11) or Bluetooth (IEEE 802.15.1) may be established. The developer's computer communicates via the one or more networks 100 with the one or more servers 160.

It is also possible for all of the actions taken by the developer's computer to be conducted by the terminal.

The terminal 120 can have a number of components including client software 122. In one approach, the client software is launched when the terminal establishes the communication link 102 with the developer's computer 140. The client software is configured to provide a functionality as described herein. Modern terminals often already have software and hardware resources which are sufficient to carry out the functionality described herein. In some cases, additional software can be provided for the terminal, if needed. An interface 124 to the developer's computer allows the terminal to establish a connection with the developer's computer. The interface can include a Wi-Fi circuit or a port for a cable connector, for instance. An interface 126 to a cellular telephone network allows the terminal to communicate voice and other data via the cell phone facility 110. The interface can include an RF transmitter and receiver, for instance. One or more processors 128 are provided for executing processor-readable code which is stored in a volatile memory 130 such as RAM and/or non-volatile memory 132 such as ROM. The memories 130 and 132 are considered to be tangible computer readable storage having computer readable software embodied thereon for programming the at least one processor 128. A user interface 134 can include a keyboard and/or screen.

Note that in one approach, the user interface of the terminal is not used as part of the application development process. Instead, all development occurs via a user interface of software development tools which run on the developer's computer. The software development tools can have an offline capability, in which it is not connected to the one or more servers 160, as well as connected capability, in which it is connected to the one or more servers 160. Thus, the user interface of the developer's computer, external to the terminal, can be the exclusive user interface for deploying unsigned applications to the terminal. This approach makes it harder for unauthorized persons to access the terminal. Requiring the use of software development tools on a separate computer to access the terminal will discourage many casual, unauthorized persons from attempting to access the terminal. Most casual users will not take on the trouble of downloading and running software development tools.

The developer's computer 140 can be any type of computer on which software development tools runs. One example of such software in the MICROSOFT WINDOWS MOBILE® Software Development Kit (SDK), which works within the VISUAL STUDIO® development environment. SDKs typically include emulator images for developers to test and debug their applications while writing them. Other examples include SDKs of the various operating systems mentioned previously. The developer's computer 140 can be essentially any type of computer, such as a personal computer (PC), a desktop computer, a terminal which is connected to a host, an all-in-one computer, a work station, or a laptop computer, including a notebook or a net book computer. Essentially, the developer's computer 140 is a separate computer than the terminal and provides appropriate resources for a developer to run the software development tools. The developer's computer has a number of components, including software development tools 142. In one approach, the software development tools are launched by the developer when the developer desires to use the application. The software development tools are configured to provide a functionality as described herein, as well as providing conventional tools for application development. An interface 144 to a terminal allows the developer's computer 140 to communicate with the terminal 120. The interface can include a Wi-Fi circuit or a port for a cable connector, such as a USB port, for instance.

An interface 146 to the service allows the developer's computer 140 to communicate with the servers 160 via the at least one network 100. The interface can include a network interface card (NIC), for instance. One or more processors 148 are provided for executing processor-readable code which is stored in a volatile memory 150 such as RAM and/or non-volatile memory 152 such as a hard disk or solid state memory. The memories 150 and 152 are considered to be tangible computer readable storage having computer readable software embodied thereon for programming the at least one processor 148. A user interface 154 can include a keyboard, mouse and/or screen displays, as discussed further below.

The one or more servers 160 can be located in one or more locations. In one approach, a registration server 162 is used for storing developer and terminal registration information, including a database of registered developers and terminals. The developer can establish an account which is maintained according to a registration agreement which specifies, e.g., a price the developer pays, payment information such as a credit card number, a maximum number of terminals which can be registered by the developer, and an expiration date of the registration. Identifiers of one or more terminals can be linked to the developer's account when the terminals are registered. An authentication server 164 receives and stores authentication information of the developer such as a developer identifier and password. The developer may communicate with the authentication server directly or via the registration server. The developer can provide authentication information using a single sign-on service such as WINDOWS LIVE™ ID, which allows the developer to log in using one account to many web sites or services, such as instant messaging, e-mail, and music download sites. Another example credential authentication system is OpenID. In one scenario, the developer is authenticated when the developer uses the developer's computer 140 to visit a web site for reasons which are unrelated to registering with the service. When the developer is subsequently involved in the registration process, the registration server 162 can access the authentication server 164 to determine that the developer has already been authenticated, so that the developer need not provide additional authentication information.

An application server for signed applications 166 can be accessed by the terminal 120 to download signed applications, which can be include applications which are no longer under development and have been approved for release by the service. Typically, such applications are catalogued and made available to the public. A general user of the terminal can download a signed application from the server 166 to the terminal 120. The signed applications can be run on the terminal only after their signature is verified. Note that the same terminal can run both signed and unsigned applications. That is, even after a terminal has been unlocked so that it runs unsigned binaries/applications provided by a developer, it can still retain the capability to enforce signatures for other, signed applications.

An application server for unsigned applications 168 includes applications which are still in development and have not been approved for release to the general public. Commonly, developers seek to have other developers, such as colleagues, run and test their applications before they are released, in a sharing process. A developer can upload an application to the server 168 where it will be catalogued and made available to other registered developers on a restricted basis, such as by requiring a password. Applications in this state (not yet approved for public distribution) may be signed or unsigned.

Generally, the service which is provided can have the following features: (1) enable developers to unlock a terminal through an on-terminal client that communicates in an authenticated way with a web service, (2) enable developers to manage the terminals they have unlocked through the developer portal, (3) ensure that retail terminals can connect to a web service and verify whether they are in a locked or unlocked state, (4) ensure that a given developer can only unlock a predefined number of terminals, (5) ensure that the developer portal and web service can respond to different types of developers and ensure that the number of terminals that can be unlocked can vary by developer type, and (6) ensure that developers without the requisite account for the developer portal cannot unlock their retail terminals.

Some example scenarios which are enabled are as follows.

Scenario 1: Cheryl has been developing a new game for a smart phone. During the early development phases, she used a terminal emulator to test, validate, and debug her game. She is happy with this solution because of the speed with which she can code, build, deploy, debug, and then iterate, as well as the fact that the terminal emulator can simulate all of the phone behaviors (such as accelerometer input) which her game uses. With development nearing the end stages, she wants to test her game on a real phone to ensure that everything is functioning properly. She is also eager to use her game in a real world situation to validate game play and the overall user experience. She tethers her phone into her PC, and from within the software development tools, selects a deploy command. Selecting her phone from the list of targets, she is informed that she must register her phone for development, and clicks through a simple wizard. Within minutes, the phone has been registered for development, the game deploys to the phone, and she's playing the game on the phone.

Scenario 2: Timothy is developing a data snacking application, e.g., an application which gathers small amounts of data from different web sites, and is ready to deploy to his terminal. He tethers the terminal with the PC, and from within the software development tools, selects a deploy command. Selecting his terminal from the list of targets, he is informed that he must register his terminal for development, and clicks through a simple wizard. As he progresses through the wizard, he is informed that he is not yet fully registered as a terminal developer. The web browser launches to the developer portal, where he completes his registration. He then returns to the developer terminal wizard, where he confirms that he is now properly registered. Within minutes, the terminal has been registered for development, his application deploys to the terminal, and he is running the application.

Scenario 3: Kathy is building a music video application, and is ready to deploy to her terminal. She tethers her terminal to her PC, and from within software development tools, selects a deploy command. She previously registered her terminal, so when she selects the terminal from the list of tamets, the application immediately deploys, and within a minute she's able to interact with her application on the terminal.

Scenario 4: Kevin is building a mapping application, and is ready to deploy to his terminal. He establishes a wireless link between the terminal and the PC, and from within software development tools, selects a deploy command Selecting his terminal from the list of targets, he is informed that his developer registration has expired. His web browser launches to the developer portal, where he renews his registration. He then returns to the developer terminal wizard, where he confirms that he is now properly registered. Within minutes, his terminal has been registered for development, his application deploys to the terminal, and he is running his application.

In one approach, the service can deploy HTTP-based application programming interfaces (APIs) which allow a terminal to perform various actions, such as request its state (locked or unlocked), set its state (locked or unlocked), and authenticate using its unique terminal identifier (TerminalID) as well as data which indicates a developer has been authenticated. The service also enforces a maximum allowable number of terminals per developer, which can be adjusted on a per-developer basis. The service can also provide an administrator console that allows an administrator to adjust the number of allowable terminals to be unlocked for a given account.

The following example methods can be used:

(1) UnRegisterTerminal instructs the service to issue a lock order for a terminal. Locking a terminal removes it from the list of unlocked terminals. Authentication is required. Inputs include the TeminalID and an authenticated User portable unique identifier (PUID). Outputs include a pass or fail status.

(2) RegisterTerminal instructs the service to issue an unlock order for a terminal. Unlocking a terminal adds it to the list of "unlocked" terminals for a particular developer account. An authentication user session, which contains a PUID of an authenticated user, is required. Inputs include the Terminal ID, Authenticated, a Friendly Name, and a PUID. Outputs include a pass or fail status as well as the number of days until expiry, or an expiration date.

(3) GetDeviceStatus returns the state of a particular terminal (locked or unlocked). Authentication is not required. Inputs include the Terminal ID. Outputs include an unlocked, locked or not found status. If unlocked, the service sends an Expiration Interval (time until expiration) to the terminal If locked, the service returns nil.

Some basic requirements from a logic perspective can include the following: (1) Any developer unlocking a terminal through the API must have a valid account status—this implies that at a minimum, they have paid any required fee and have been granted access to the portal. (2) The APIs enforce a terminal count per account type. Example account types include a partner organization account (where a partner organization has an established working agreement with the service provider), a non-partner organization account (where a non-partner organization does not have an established working agreement with the service provider), and an individual account. For organization accounts, the default number of terminals allowed is typically larger than for an individual account. The default number of terminals allowed should be configurable on a per-account basis. (3) If a developer exceeds the number of terminals allowed, throw an exception and ask the developer (via the terminal client) to remove one terminal from the list in the developer portal. (4) Terminal unlock should enforce an expiration timeline for the unlocked terminal. The default expiration of an unlocked terminal is twelve months and is bound to the expiration of the developer account. (5) Expiring registrations should automatically return terminals to a locked state, just as renewed registrations should extend the expiration date and keep the terminal unlocked.

The following represent some basic error code enumerations that the APIs can return: Error 901—Account not active, Error 902—Account not found, Error 903—Terminal count exceeded, Error 904—Failed to unlock terminal (generic), Error 905—Failed to lock terminal (generic) and Error 906—Terminal ID not found.

The following represents example APIs which can be used by the service.

(1) GetDeviceStatus

Path: http://api.developer.windowsphone.com/tools/02/2010/terminals/GetStatus?terminalId:Guid Method: GET Description: Gets the status of the terminal as being either locked, unlocked, or not found.

Item: Terminal Status Enum

UrlParameters terminalId: A string (global unique identifier or GUID) representing the terminal to look up Sample Response:

```
<ResponseOfGetStatusxmlns="Microsoft.WindowsMobile.Service.Marketplace"
xmlns:i="http://www.w3.org/2001/XMLSchema-instance">
    <ResponseCode>0x00000000</ResponseCode>
    <ResponseMessagei:nil="true"/>
    <Entity>
        <TerminalId>00000000000000000000000000000000</ TerminalId>
        <TerminalStatus>LOCKED</ TerminalStatus>
    <ErrorCode></ErrorCode>
    </Entity>
</ ResponseOfGetStatus>
```

(2) Lock Terminal
  Path: http://api.developer.windowsphone.com/tools/02/2010/terminals/LockTerminal?terminalId:Guid)
  Method: POST
  Description: Instructs the service to issue a lock command for the terminal.
    Item: Terminal Status Enum
    UrlParameters
    terminalId: A string (GUID) representing the terminal to look up and lock
    liveIDTicket: A ticket containing the developer information (in the header)
  Sample Response:

```
<ResponseOfLockTerminalxmlns="Microsoft.WindowsMobile.Service.Marketplace"
xmlns:i="http://www.w3.org/2001/XMLSchema-instance">
    <ResponseCode>0x00000000</ResponseCode>
    <ResponseMessagei:nil="true"/>
    <Entity>
        <TerminalId>00000000000000000000000000000000</ TerminalId>
        <TerminalStatus>LOCKED</ TerminalStatus>
    <ErrorCode></ErrorCode>
    </Entity>
</ ResponseOfLockTerminal>
```

Note that a GET request fetches data from a web server based solely on a URL value and a set of HTTP headers. There is no extra data with a GET request; everything is specified in the URL and the headers. In contrast, a POST request sends additional data to the web server, specified after the URL, the headers, and a blank line to indicate the end of the headers.

Figure 2:
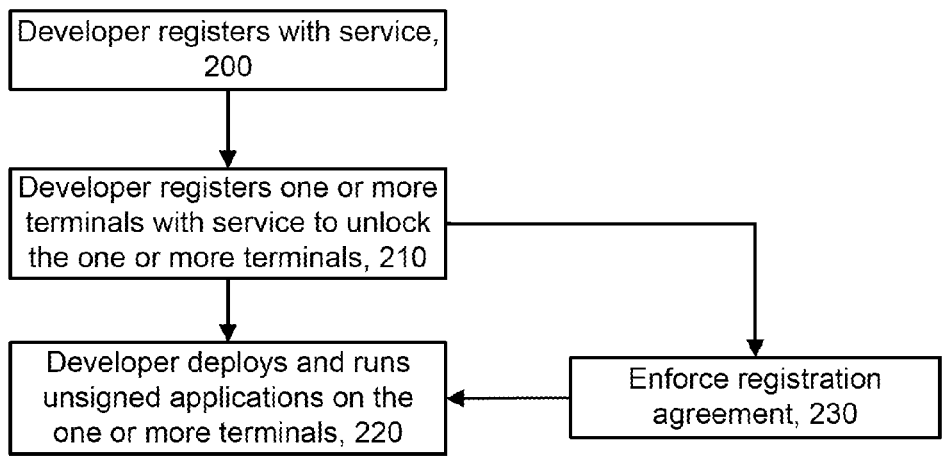
FIG. 2 depicts a method for use with the network of FIG. 1, in which a developer and a terminal are registered with a service of a developer portal, an application is deployed and run on the terminal, and registration terms are enforced.

FIG. 2 depicts a method for use with the network of FIG. 1, in which a developer and a terminal are registered with a service of a developer portal, an application is deployed and run on the terminal, and registration terms are enforced. At step 200, a developer registers with the service, according to a registration agreement. Further details of step 200 are provided in connection with FIGS. 3A and 3B.

At step 210, the developer registers one or more terminals with the service to unlock the one or more terminals. Further details of step 210 are provided in connection with FIGS. 4A-4g. At step 220, the developer deploys and runs applications on the one or more terminals. Further details of step 220 are provided in connection with FIG. 5. At step 230, terms of the registration agreement are enforced, e.g., during a time period in which the one or more terminals are registered. Further details of step 230 are provided in connection with FIGS. 6A-6C.

Figure 3A:
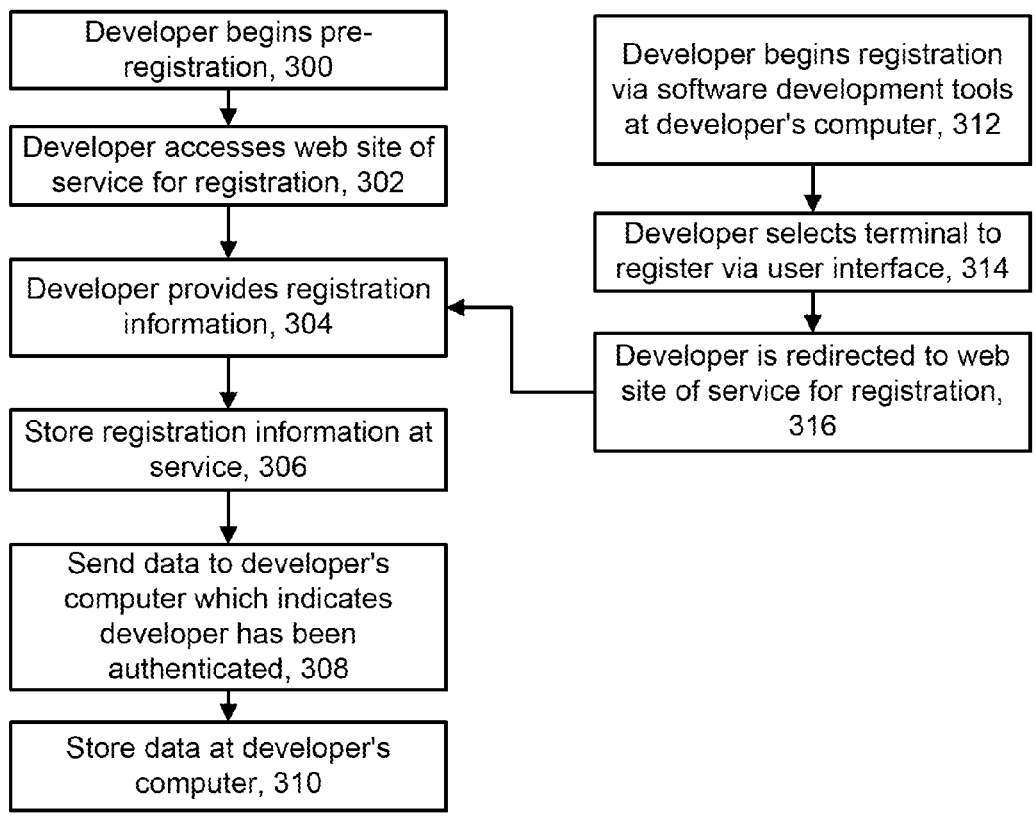
FIG. 3A depicts further details of step 200 of FIG. 2, in which a developer registers with a service of a developer portal.

FIG. 3A depicts further details of step 200 of FIG. 2, in which a developer registers with a service of a developer portal. In one situation, the developer begins a pre-registration at step 300. Generally, this occurs when the developer registers himself or herself with the service some time before registering a terminal with the service. At step 302, the developer accesses a web site of the service for registration, e.g., using a conventional web browser. At step 304, the developer provides registration information via the web site. See FIG. 3B for further details. At step 306, the service stores the information, e.g., at one or more servers. At step 308, the service sends data to the developer's computer which indicates the developer has been authenticated. This data can include, e.g., a service ticket or other encrypted cookie with tokens or tokenized key value pairs. At step 310, the data is stored at the developer's computer.

In a second registration situation, the developer begins the registration via the software development tools at the developer's computer, such as in conjunction with registering a terminal (step 312). At step 314, the developer selects a terminal to register via a user interface. At step 316, the developer is redirected to the web site of the service for registration, and the remaining steps 304-310 occur as discussed previously.

Figure 3B:
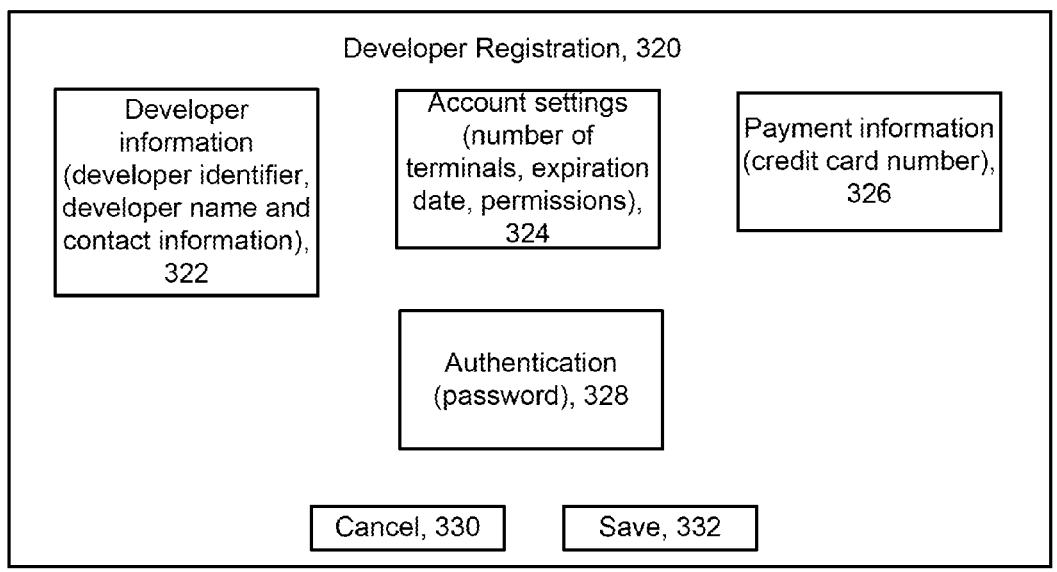
FIG. 3B depicts an example user interface associated with step 304 of FIG. 3A in which a developer provides registration information.

FIG. 3B depicts an example user interface associated with step 304 of FIG. 3A in which a developer registers with a service of a developer portal. An example user interface or screen display 320 is for "Developer registration." It includes a section 322 for developer information, in which the developer clicks through to a form to enter, e.g., a developer identifier, developer name and contact information. A section 324 is for account settings, in which the developer clicks through to a form to enter, e.g., a number of terminals to register, expiration date, and permissions. Different permissions can optionally be used to grant access to different features separately. For example, different permissions can allow the terminal to run debugging applications and development-related processes such as profilers, which may be part of the software development tools. In another example, one permission may be appropriate for a student software developer and enable only basic application development features for the terminal, while another permission may be appropriate for a professional software developer and enable basic and advanced application development features for the terminal.

A section 326 is for payment information, in which the developer clicks through to a form to enter, e.g., a credit card number. A section 328 is for authentication, in which the developer clicks through to a form to enter developer authentication information, e.g., a developer identifier, if different from that used in the developer information 322, and a password. For example, with WINDOWS LIVET™ ID, the developer provides an e-mail address and password. The developer authentication information need not be associated with the developer's computer, so that the terminal is not tied to running only with a certain developer's computer. A button 330 allows the developer to cancel the current inputs, and a button 332 allows the developer to save the current inputs.

FIG. 4A depicts further details of step 210 of FIG. 2, in which a developer registers one or more terminals with a service of a developer portal to unlock the one or more terminals. At step 400, a communication link between a terminal and a developer's computer is established. As mentioned, this can include connecting a cable between the two devices. At step 402, client software is launched at the terminal in response to detecting the communication link. Launching the client software only when the communication link is established can minimize the performance impact of an additional application/service running on the terminal.

At step 404, the client software waits and listens for an inbound message from the developer's computer. At step 405, the developer selects the terminal via a user interface of the software development tools. In response, at step 406, the developer's computer sends data to the terminal which indicates that the developer has been authenticated. This can be the data referred to in steps 308 and 310 of FIG. 3A, for instance. In response, at step 408, the terminal sends a request to unlock itself to the service, where the request includes the data received from the developer's computer and a terminal identifier. The identifier can include, e.g., a hardware-specific certificate, a terminal serial number or other unique terminal identifier. An example is the International Mobile Equipment Identity (IMEI) number. Note that some terminal identifiers such as the IMEI number can be accessed by a developer via a user interface of the terminal, as well as by client software at the terminal. The identifier should be unique to the terminal and should not change regardless of resets or reformatting of the terminal. The terminal may have an API that is directly tied to hardware to allow the client software to access the identifier. WINDOWS MOBILE® uses an API GetDeviceUniqueID( ) for this purpose. The request at step 408 can be a standard web services call using an API at the terminal. For example, an HTTP call may be used in which the header carries the data which indicates that the developer has been authenticated.

The terminal can communicate with the one or more servers of the service via the developer's computer in a pass-through manner (step 412), or via another link such as a cell phone channel (step 410, see FIG. 1). For example, regarding step 412, MICROSOFT ACTIVESYNC® uses a Desktop Pass-through (DTPT) technology to perform synchronization. DTPT enables a terminal to transparently access external networks such as the Internet, through a developer's computer to which the terminal is connected. Another approach is connecting the terminal to the service using an emulated serial port over USB.

At decision step 414, the service determines if unlocking of the terminal is authorized. Further details are provided in FIG. 4B. If unlocking is authorized at decision step 414, the service sends a command with unlock data, such as a license file or a persistent token such as a registry key, and an expiration date, to the terminal at step 416. The registration state (unlock or lock) can be persisted as a Boolean or secured by a license or certificate. The terminal determines that it is unlocked by detecting the presence of the persistent token or license file. An example license can be provided using a Digital Rights Management (DRM) scheme such as MICROSOFT PLAYREADY®. The nature of the license ensures that it was not tampered with and came from an authoritative place. A license file can include a certificate file.

The expiration data can be expressed, e.g., in terms of a time period (such as one year) in which the unlock status is authorized to be persisted, or an expiration date. Or, the terminal may be configured to enforce a default expiration date. Note that the command can be provide in one or more messages from the service to the terminal. For example, one message may include the unlock data, and another message may include the expiration date. The command could also include an identifier of the developer for tracking purposes. The identifier of the developer can be stored at the terminal.

Persisting the unlocked state can include maintaining or storing the unlock data at the terminal. Logic flows at the client software can implement an alternate behavior by recognizing the unlock state. For example, the unlock state can be recognized by validating a license. The locked state behavior may dictate that only signed applications which are downloaded from the service can run on the terminal, and the unlocked state behavior may dictate that unsigned applications which are downloaded from the software development tools or other source can also run on the terminal.

Generally, by using certificate material, such as a hash of some known server value (e.g., an identifier associated with a server), we can authenticate that the unlock state of a terminal has not been tampered with.

The unlock data provided at step 416 can also provide control of additional unlock restrictions, other than the unlock state, in the same way that the unlock duration/expiration is controlled. For example, the unlock data can: (a) limit the number of applications that can be installed on a unlocked terminal from the service, (b) set controls for expiration of installed applications, (c) limit the number of number of application launches, and so forth.

In case (a), if the limit on the number of installed applications has been reached, the developer will be prohibited from installing an additional application on a terminal. A message may be provided on the developer's computer which informs the developer of the limitation. The developer may be informed of an option to delete a previously-installed application so that a new application can be installed without exceeding the limit, or to access the service to purchase additional rights to install another application.

In case (b), a time can be set at which the authorization to run an application expires. Different installed applications can have different expiration times. An application-specific expiration date can be enforced similar to the way in which an expiration date of a terminal registration is enforced, e.g., as discussed below in connection with FIGS. 6A and 6B.

In case (c), if the limit on the number of times an application can be launched has been reached, the developer will be prohibited from launching the application again on a terminal. A message may be provided on the developer's computer which informs the developer of the limitation. The developer may be informed of an option to access the service to purchase additional rights to launch the application. This limit can be enforced on a per-application basis, for instance.

At step 418, the terminal stores the unlock data and the expiration date. At step 419, the terminal unlocks itself such as by calling an API using the unlock data. An example call has the format: SetDeveloperUnlockState(DEVELOPERUNLOCK_STATE_UNLOCKED).

At step 419, if the unlock is successful, binary files (binaries) from the software development tools can be copied from the developer's computer to the terminal (step 420). In an example implementation, each binary file can be packaged as an XAP file and deployed to a package manager for installation. XAP is a zip (compressed) file with a MICROSOFT® SILVERLIGHT™ application contained within it. MICROSOFT® SILVERLIGHT™ is a web application framework that provides functionalities similar to those in the ADOBE® FLASH® platform, integrating multimedia, graphics, animations and interactivity into a single runtime environment. All binary files deployed to the terminal through this mechanism may call GetDeveloperUnlockState at initialization and validate that it returns DEVELOPERUN- LOCK_STATE_UNLOCKED to validate that the terminal is unlocked. If the terminal is not unlocked, these binaries should terminate. After all binaries have been copied to the terminal and installed, the user interface on the developer's computer can notify the developer that the terminal is available (step 421) and display an identifier of the terminal (see FIG. 4F).

If the unlocking is not authorized at decision step 414, the service optionally sends an error message to the terminal at step 422, and the terminal can optionally report a corresponding error message to the developer's computer via the software development tools at step 424.

Figure 4B:
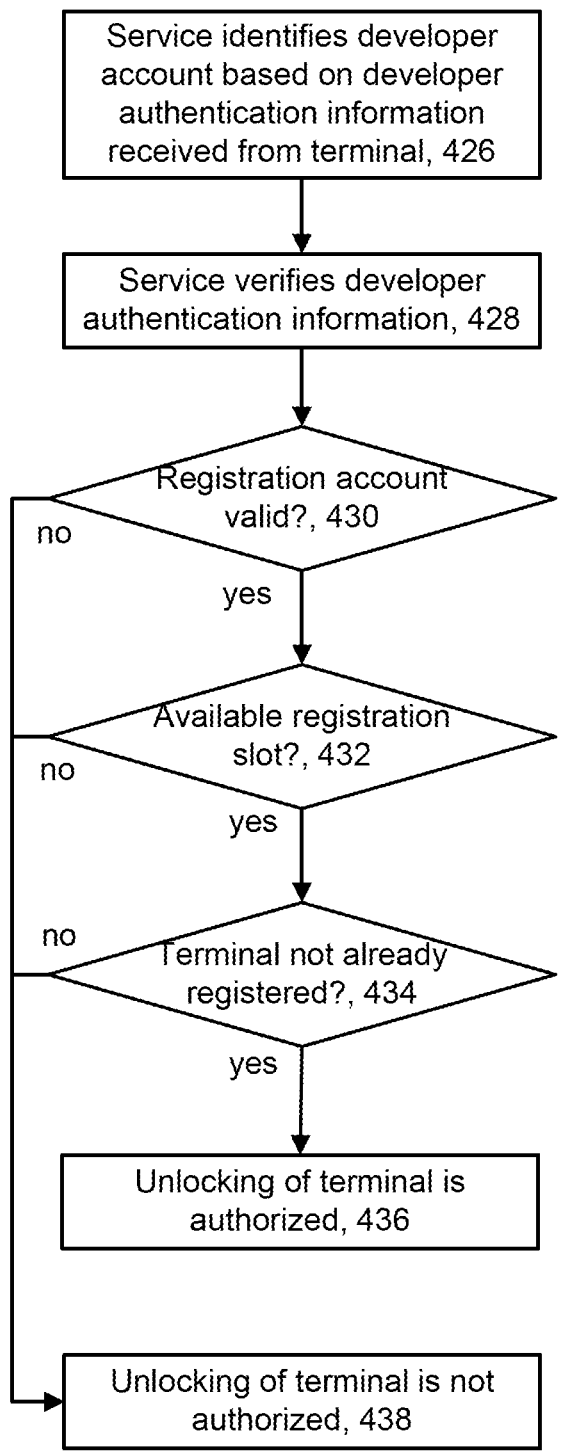
FIG. 4B depicts further details of decision step 414 of FIG. 4A, in which a service determines whether unlocking of a terminal is authorized.

FIG. 4B depicts further details of decision step 414 of FIG. 4A, in which a determination is made as to whether unlocking of a terminal is authorized. For example, at step 426, the service identifies an account of the developer based on developer authentication information provided by the terminal. This developer authentication information can be the data which was provided to the developer's computer, and which indicates that the developer has been authenticated by one or more servers of the service. At step 428, the service verifies the developer authentication information provided by the terminal with the developer authentication information which was previously associated with the account to ensure that there is a match. Note that in the initial communication from a terminal to the service, the terminal identifier may not be associated with a developer account. After a terminal is registered, the terminal identifier is associated with the developer account, so that a subsequent request from the terminal can be associated with a developer account based on the terminal identified. The terminal may, but need not, provide developer authentication information in the subsequent requests.

A decision step 430 determines if the registration account is still valid. An account may be invalid if terms of the registration agreement have been violated, such as non-payment or other behaviors which are violations, e.g., fraud or use of malware. These other behaviors may become known to the administrator, who has the authority to invalidate an account. A decision step 432 determines if a registration slot is available. A slot is available if the maximum allowable number of terminals to be registered for the account has not been exceeded. A decision step 434 determines if the terminal is already registered. For example, the terminal identifier may be in a list of terminal identifiers which are already registered to the account. Unlocking of the terminal is authorized at step 436 if decision steps 430, 432 and 434 are true. Otherwise, unlocking of the terminal is not authorized at step 438.

Figure 4C:
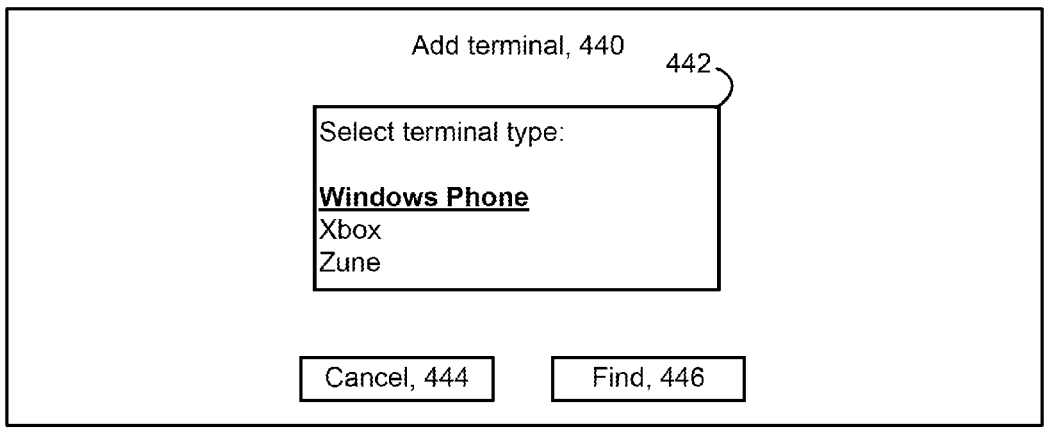
FIGS. 4C and 4D depict example user interfaces associated with step 405 of FIG. 4A by which a developer selects one or more terminals to register.
Figure 4D:
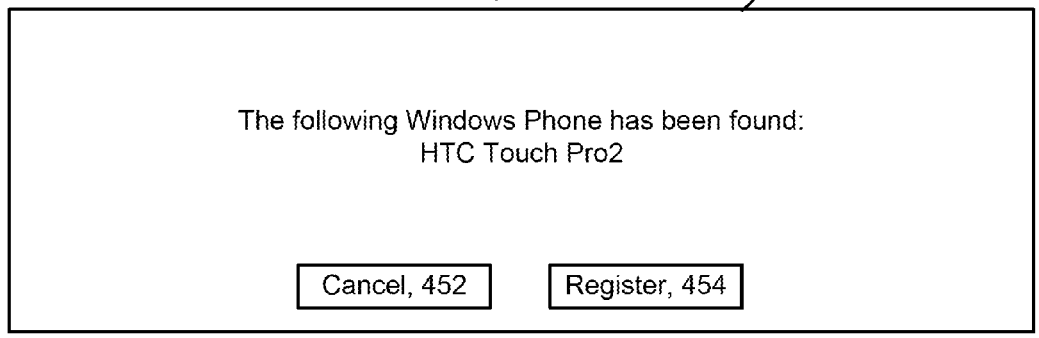

FIGS. 4C and 4D depict example user interfaces associated with step 405 of FIG. 4A by which a developer selects one or more terminals to register. In FIG. 4C, an example user interface or screen display 440 is for "Add terminal." It includes a section 442 in which a developer can select a type of terminal, such as "Windows Phone," "Xbox" or "Zune." In this example, "Windows Phone" is selected by the developer through appropriate inputs, e.g., using a mouse. A button 444 can be selected to cancel the process, and a button 446 can be selected to find a terminal of the selected type. When the button 446 is selected, the software development tools automatically detect any terminal which has a communication link with the developer's computer, and which is of the selected type, using auto-detection technology. In FIG. 4D, an example user interface or screen display 450 indicates that a terminal of the selected type has been found, and an identification of the terminal, e.g., "HTC Touch Pro2," which is an example model name of a WINDOWS® smart phone, is provided. A button 452 can be selected to cancel the process, and a button 454 can be selected to register the terminal using the techniques described herein.

Figure 4E:
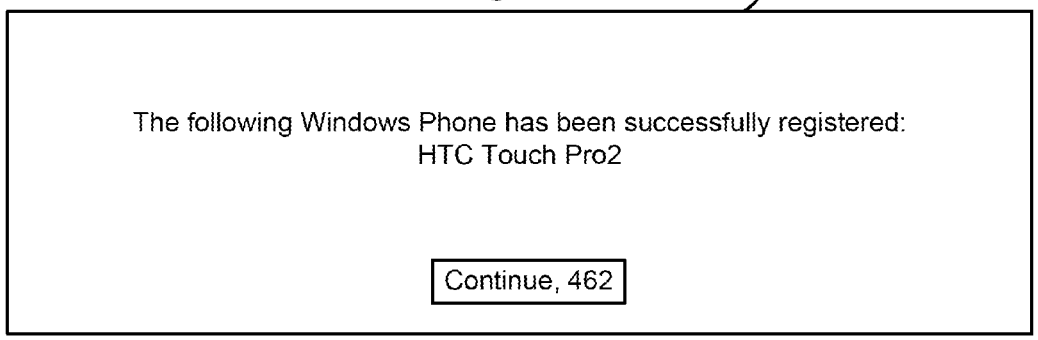
FIG. 4E depicts an example user interface associated with step 421 of FIG. 4A which provides a report indicating that a terminal has been unlocked.

FIG. 4E depicts an example user interface associated with step 421 of FIG. 4A which provides a report indicating that a terminal has been unlocked. An example user interface or screen display 460 indicates that the selected terminal has been successfully registered, and provides the identification of the terminal. A button 462 can be selected to continue to other portions of the software development tools which allow preparing, deploying, executing, debugging or sharing of an application.

FIG. 4F depicts an example user interface associated with step 420 of FIG. 4A which provides a report indicating all terminals associated of a developer account which have been unlocked. The user interface can be provided via a web site of the service, and allows a registered developer to view and remove/unregister terminals that are currently unlocked to ensure that the online list of registered terminals remains in sync with those terminals that are actually registered. The user interface also allows the developer to manage a limited number of terminals, to determine the allowable number of registered terminals as well as a count of locked and unlocked terminals, to determine a default allowable number of terminals to unlock per account type. The developer is required to have an account before accessing the user interface, in one approach.

An example user interface or screen display 470 includes an "Account information" section which includes various selections. "User profile" can be selected to view and update details such as the developer name and contact information. "Business details" can be selected to view information such as terms of the registration agreement. "Payment information" can be selected to view details such as a credit card number which is on file. "Terminal manager" is selected here, resulting in the display region 474, which depicts "My unlocked terminals." This region provides a summary of all terminals which have been registered to the developer. The region 474 indicates a current number of unlocked terminals, e.g., 3, and a maximum allowed number of unlocked terminals, e.g., 5. For each of the three terminals, a terminal name, terminal identifier, unlock expiration date and "remove" action are provided. The "remove" link can be selected to unregister the corresponding terminal. In one approach, upon selecting the button 478, the developer's computer or the service sends an unregister command to the terminal, in response to which the terminal sends a request to the service to unregister the terminal, and receives a corresponding command from the service to unregister. In this way, the service can manage the terminals. The request can include the data which authenticates the developer, similar to the request to register, discussed previously. The button 476 can be selected to cancel the current user interface selection.

Figure 4G:
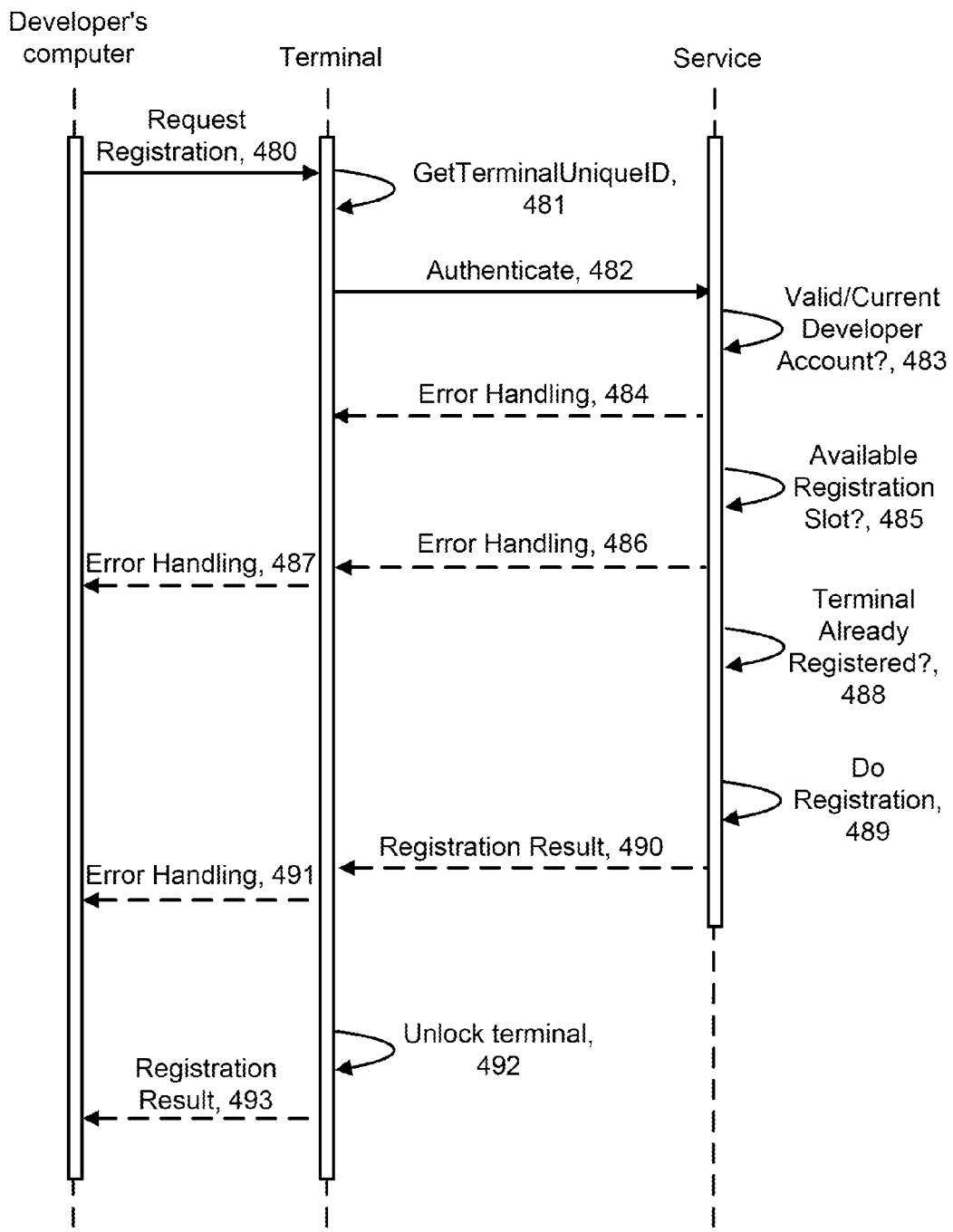
FIG. 4g depicts a process flow diagram for step 210 of FIG. 2, in which a developer registers one or more terminals with a service of a developer portal to unlock the one or more terminals.

FIG. 4g depicts a process flow diagram for step 210 of FIG. 2, in which a developer registers one or more terminals with a service of a developer portal to unlock the one or more terminals. At process 480, the developer's computer sends a registration request to the terminal, to request that the terminal registers itself. At process 481, the terminal accesses its identifier using a call GetDeviceUniqueID. At process 482, the terminal sends authentication data to the service. At process 483, the service determines if the developer account is current and valid. If the account is not current and valid, an error handling process 484 occurs. Example error codes were discussed above in connection with FIG. 1. At process 485, the service determines if there is an available registration slot, e.g., the maximum number of terminals has not already been registered to the account. If there is no available registration slot, an error handling process 486 occurs. An error handling process 487 from the terminal to the developer's computer occurs if either of the error handling processes 484 or 486 occurs.

At process 488, the service determines if the requesting terminal has already been registered to the account. At process 489, the service performs the registration. Process 490 provides the registration result to the terminal, e.g., a command to unlock the terminal. An error handling process 491 from the terminal to the developer's computer occurs if needed, e.g., if the terminal is already registered. At process 492, the terminal unlocks itself. At process 493, a registration result is provided from the terminal to the developer's computer, e.g., an indication that the terminal has been unlocked.

FIG. 5 depicts further details of step 220 of FIG. 2, in which an application is deployed and run on an unlocked terminal. At step 500, the developer develops an application using software development tools, which includes a terminal emulator, on the developer's computer. At step 502, the developer uses the software development tools to deploy and run an unsigned application on the terminal. At step 504, the client software at the terminal receives and stores the unsigned application without verifying its authenticity.

As mentioned, once the terminal is unlocked, it can run unsigned applications, thereby facilitating the developer's work. Commonly, the developer will develop several builds of an application in a day which are each deployed and run. The developer can deploy each build independently of the service. This is an advantage compared to other approaches which use a certificate-based system for the developer to authorize and sign each build of an application, where the certificate is specific to the developer. Such approaches install and store a certificate on the terminal, and require several set up steps.

In contrast, the unlocked state allows an unsigned application which was developed by another instance of the software development tools, e.g., on another developer's computer, to be deployed directly to, and executed at, the terminal. Thus, the developer can connect the terminal to another developer's computer, which runs another instance of the software development tools, and deploy a separate application/application build to the same terminal. Thus, the unlocked state of the terminal can be persisted independently of the developer's computer which was used to register it so that the unlocked state allows applications to be deployed and executed on the terminal from different instances of the software development tools which run on different developer's computers. Moreover, the unlocked state of the terminal is persisted independently of the developer and the developer's account so that the unlocked state allows applications to be deployed and executed on the terminal from different users of the software development tools.

Further, an unsigned application can be deployed to any registered terminal. With other approaches, the developer has to know ahead of time which terminals an application will run on, and to keep track of that information and, if the developer attempts to run an application on another terminal, or if another developer attempts to run an application, it will not run, because the authorization to run is tied to the developer or developer's computer.

The above-mentioned advantages provide great flexibility and efficiency in a development process which involves one or more developers. A certificate-equivalent level of security is provided with a "left open" level of simplicity for developers, as if the terminal was shipped unlocked. Moreover, although the applications can be loaded without interacting with the service or other centralized manager, the service maintains control of the terminals since they can be unregistered (deregistered) when they check in periodically. For example, a developer who is known to have violated the registration agreement, such as by distributing code breaking software, may have his or her account revoked so that terminals registered to the developer are deregistered when they check in. The check in may occur relatively frequently such as every two weeks, for instance, so that a period of unauthorized use is not that long. In another possible scenario, registered terminals of a developer may be lost or stolen, in which case the developer can request that the service deregister the terminals in their next check in, so that the developer can register another terminal in place of the lost or stolen terminal, without exceeding the maximum allowed number of terminals per the registration agreement. Further, the terminal itself can be associated with a particular developer by its identifier so that the developer can be liable for giving the terminal to another person who violates the registration agreement by accessing the developer identifier in the phone.

At step 506, the developer performs debugging of the application using the software development tools. Optionally, at step 508, the developer can share an application with other registered developers and their registered terminals so that they may test it and provide feedback. One possible approach to do this involves the developer uploading the unsigned application to the service. At step 510, the service stores and catalogs the application. At step 512, another registered developer downloads the unsigned application from the service to his or her computer so that it can be deployed to any registered terminal.

In particular, to share an application, a developer can pre-register, with the service, a terminal which is to download a shared unsigned application. This registration process can involve the developer authenticating himself or herself to the developer portal, e.g., by logging in using their authentication information. The developer then provides a non-spoofable terminal-specific identifier, such as the IMEI number, or a hardware-based hash returned by an API such as GetDeviceUniqueID( ). The sharing involves receiving and provisioning a terminal-specific license, which can be implemented as a terminal-specific certificate, at the terminal. The license may be used by various processes as validation that the terminal has been unlocked and authorized for sharing.

Figure 6A:
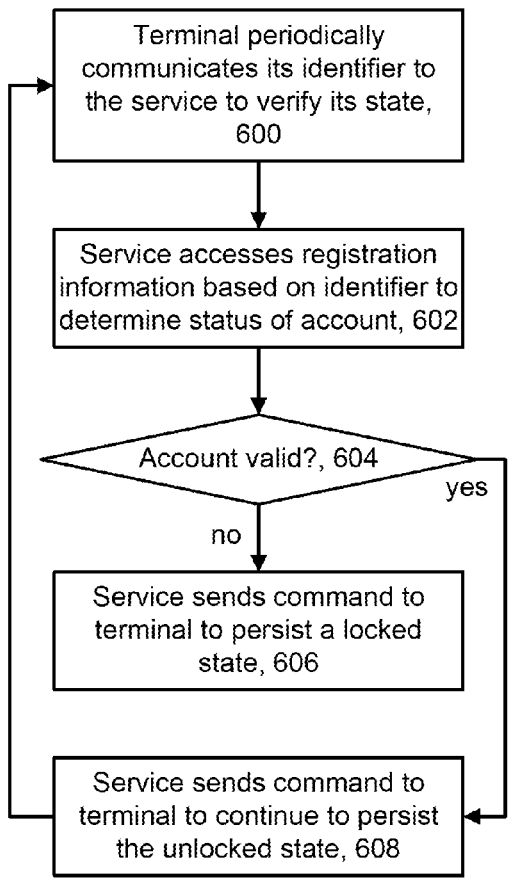
FIG. 6A depicts further details of step 230 of FIG. 2, in which registration terms are enforced relative to an account status.

FIG. 6A depicts further details of step 230 of FIG. 2, in which registration terms are enforced relative to an account status. As mentioned, while great flexibility and ease of use is provided to the developer, the service can still maintain a degree of control over the deployment of applications to terminals. In one possible approach, the terminal is configured to periodically communicate its identifier to the service to verify the terminal's state at step 600, in a check in process. The check in can occur on a non-deterministic schedule, e.g., at randomized times, when the terminal is connected to a network, such as once every few days. For example, a smart phone can check in via a cell phone connection, or via a Wi-Fi or Bluetooth connection. At step 602, the service accesses the registration information based on the identifier to identify the corresponding account and determine the status of the account. The status can be valid or invalid/revoked, for instance. The terminal identifier is linked in a database to a corresponding developer account and associated account status information. At decision step 604, if the account is valid, the service sends a command to the terminal to continue to persist the unlocked state, at step 608. If the account is invalid, the service sends a command to the terminal to set and persist a locked state, at step 606.

For example, when the command is received by the terminal, an API SetDeveloperUnlockState(DEVELOPERUN-LOCK_STATE_LOCKED) can be called to relock the terminal. In one approach, the binary files from the software development tools and any unsigned applications that have been installed at the terminal can remain when the locked state is persisted. In this case, continuity for the developer is maintained if the terminal becomes unlocked again. Alternatively, the binary files and/or any unsigned applications can be deleted when the locked state is initiated. Note that the terminal can also be locked based on a developer command, such as via the "Remove" action in the user interface of FIG. 4F. A developer may desire to deregister a terminal when it is no longer needed for application development.

Figure 6B:
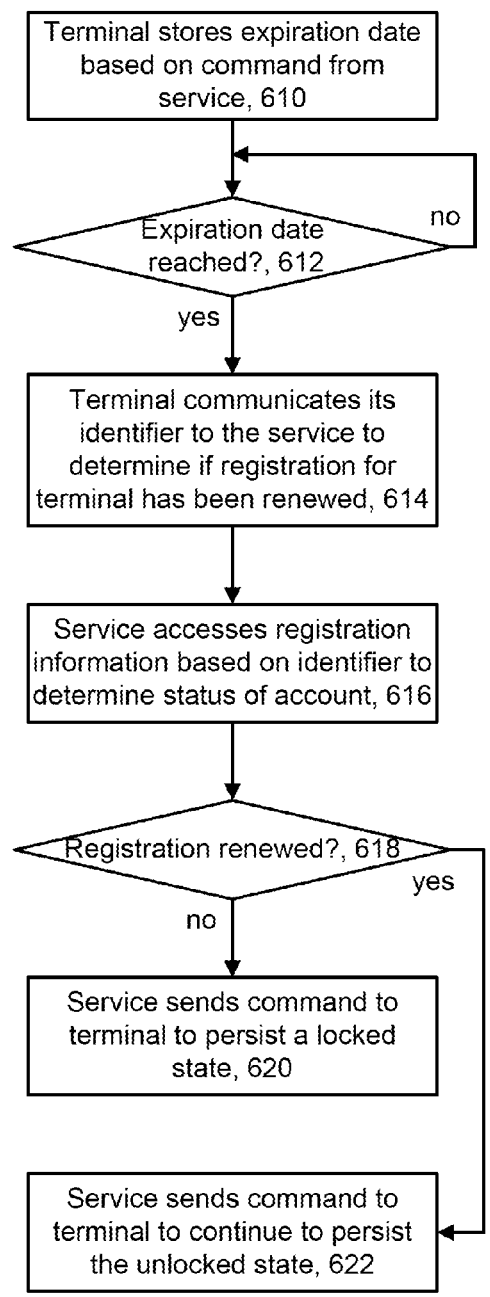
FIG. 6B depicts further details of step 230 of FIG. 2, in which registration terms are enforced relative to an expiration date.

FIG. 6B depicts further details of step 230 of FIG. 2, in which registration terms are enforced relative to an expiration date. At step 610, a terminal stores an expiration date based on a command from the service, e.g., when the terminal is first unlocked. At decision step 612, when the expiration date (and/or some time before and/or after the expiration date) is reached, the terminal communicates its identifier to the service to determine if the registration for the terminal has been renewed, at step 614. The service may contact the developer beforehand, such as via an e-mail message to inform the developer to renew the service such as by accessing the service's web site.

Note that the terminal may also reconcile the expiration date it maintains with an expiration date which the server maintains, by checking in with the service from time to time prior to the expiration date which the terminal maintains, and when checking in with the service at the expiration date which the terminal maintains. If there is a discrepancy, the terminal can change its expiration date to correspond to the expiration date maintained by the service.

At step 616, the service accesses the registration information based on the identifier to determine the status of the corresponding account. At decision step 618, if the registration has been renewed, the service sends a command to the terminal to continue to persist the unlocked state, at step 622. If the registration has not been renewed, the service optionally sends a command to the terminal to set and persist a locked state, at step 620. The terminal can revert to the locked state as well upon detecting that the expiration date has passed.

As mentioned in connection with FIG. 4A, the unlock data which is provided to a terminal can set a time at which the authorization to run an application expires. Moreover, different installed applications can have different expiration times. Enforcement of an application-specific expiration date can proceed based on the above discussion involving FIGS. 6A and 6B.

In the example of FIG. 6A, step 600 can be modified to provide for the terminal communicating an identifier of an application to the service. Step 602 can be modified to provide for the service determining the status of one or more applications which have been authorized for the terminal, e.g., by using the identifier of the application. Step 604 can be modified to provide for the service determining if an application is valid, e.g., it is valid if its expiration date has not yet been reached. The service may cross reference the identifier of the application to an expiration date which has been stored. If the authorization for an application has expired, but the account is still valid, step 608 can be modified to provide for the service sending a command to the terminal to persist a locked state for the specific application. Thus, an application which is authorized can be considered to have an unlocked state which is analogous to the unlocked state of a terminal, and an application which is no longer authorized can be considered to have a locked state which is analogous to the locked state of a terminal.

In the example of FIG. 6B, step 610 can be modified to provide for the terminal storing an expiration date for one or more applications which have been authorized for the terminal. Step 612 can be modified to provide for the terminal determining if the expiration date for an application has been reached. The terminal may cross reference the identifier of the application to an expiration date which has been stored. If the application has expired, step 614 can be modified to provide for the terminal determining from the service whether an authorization for the application has been renewed. This can be performed even if the terminal's expiration date has not yet been reached. Step 616 can be modified to provide for the service accessing registration information for the application to determine if the application has been renewed. The service may cross reference the identifier of the application to data which indicates if the application has been renewed. Step 618 can be modified to provide for the service determining the status of the application. At decision step 618, if the registration of the application has been renewed, the service can send a command to the terminal to continue to persist the unlocked state for the application, at step 622. The terminal can cause the application to revert to the locked state as well upon detecting that the expiration date of the application has passed. Thus, an application can be considered to have a registration which is analogous to the registration of a terminal. Different applications can be considered to have different registrations.

Note that the modification of the processes of FIG. 6A or 6B as discussed above can be made as an addition or alternative to the use of the processes of FIG. 6A or 6B for enforcing registration terms for a terminal. The use of the processes of FIG. 6A or 6B for enforcing registration terms for a terminal can be performed at different times than the use of the processes of FIGS. 6A and 6B for enforcing registration terms for an application. Similarly, the processes of FIG. 6A or 6B can be performed at different times for different applications of a terminal, or of multiple terminals.

Figure 6C:
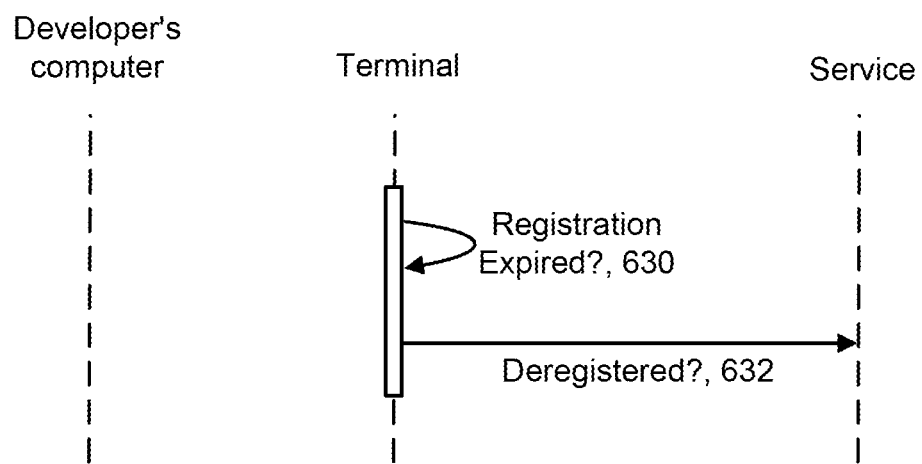
FIG. 6C depicts a process flow diagram for step 230 of FIG. 2, in which registration terms are enforced.

FIG. 6C depicts a process flow diagram for step 230 of FIG. 2, in which registration terms are enforced. At process 630, the terminal determines if its registration has expired. At process 632, the terminal communicates with the service to determine if the terminal has been registered, e.g., its registration has lapsed due to non-renewal or violation of the registration agreement.

Figure 7:
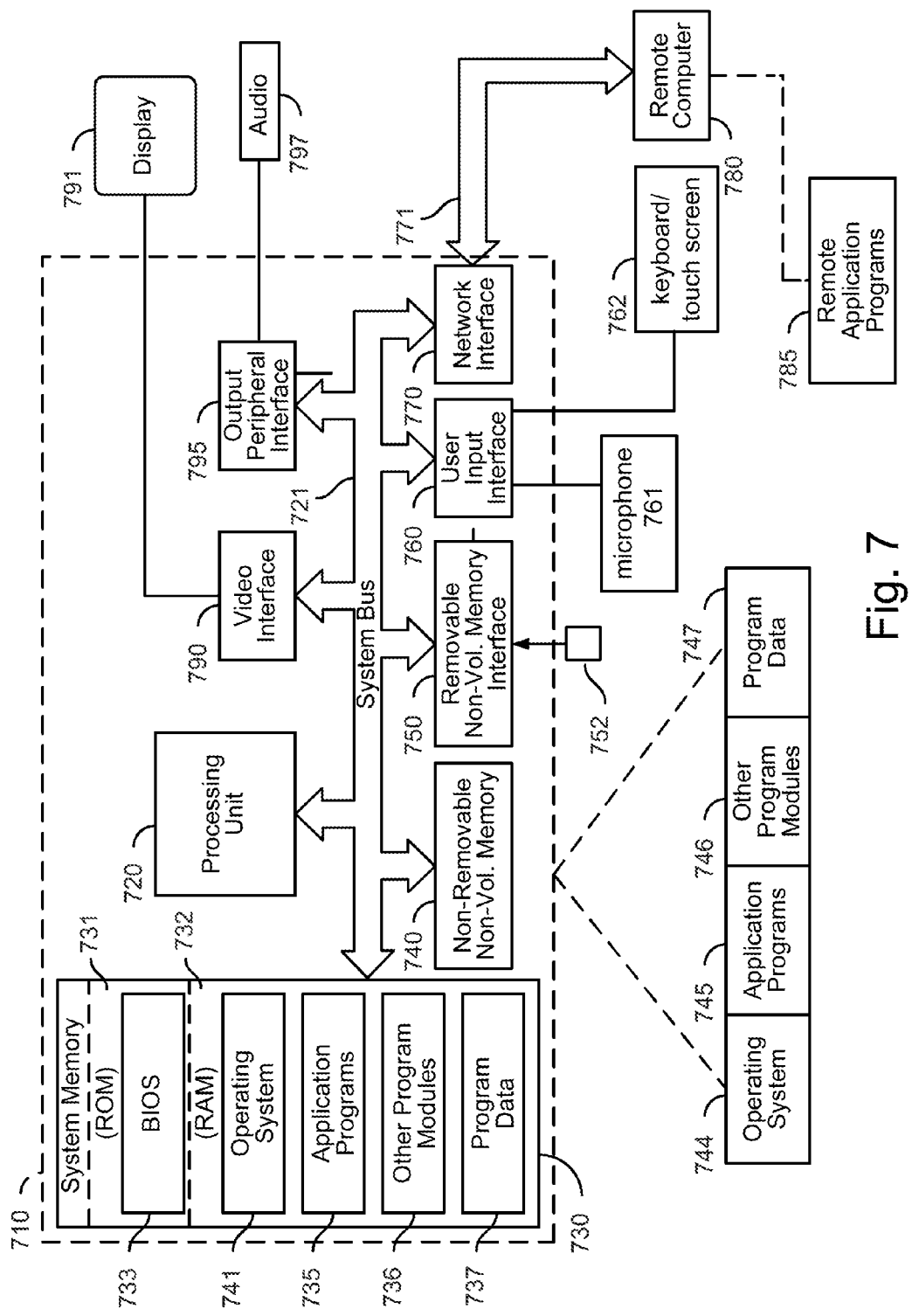
FIG. 7 depicts an example block diagram of computer hardware suitable for implementing various embodiments.

FIG. 7 depicts an example block diagram of computer hardware suitable for implementing various embodiments. The computer hardware can represent the developer's computer, terminal and/or server discussed herein, for instance. An exemplary system for implementing various embodiments includes a general purpose computing device 710. Components of computing device 710 may include a processing unit 720, a system memory 730, and a system bus 721 that couples various system components including the system memory to the processing unit 720. The system bus 721 may be, e.g., a memory bus or memory controller, a peripheral bus, and a local bus using any of a variety of bus architectures.

Computing device 710 can include a variety of tangible or non-transitory computer-or processor-readable media. Computer readable media can be any available media that can be accessed by computing device 710 and includes both volatile and nonvolatile media, removable and non-removable media. Computer readable media may comprise computer storage media such as volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage and other magnetic storage devices. Combinations of any of the above are also included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computing device 710, such as during start-up, is typically stored in ROM 731. RAM 732 typically contains data and/or program modules that are immediately accessible to and/or presently being operated on by processing unit 720. For example, an operating system 734, application programs 735, other program modules 736, and program data 737 may be provided.

The computing device 710 may also include other removable/non-removable, volatile/nonvolatile computer storage media. By way of example only, FIG. 7 illustrates a non-removable, nonvolatile memory 740 such as solid state memory, and a memory card (e.g., SD card) interface/reader 750 that reads from or writes to a removable, nonvolatile memory card 752. Other removable/non-removable, volatile/nonvolatile computer storage media that can be used in the exemplary operating environment include, but are not limited to, flash memory cards, digital versatile disks, digital video tape, solid state RAM, solid state ROM, and the like.

The computer storage media provide storage of computer readable instructions, data structures, program modules and other data for the computing device 710. For example, non-removable, nonvolatile memory 740 is illustrated as storing operating system 744, application programs 745, other program modules 746, and program data 747. These components can either be the same as or different from operating system 734, application programs 735, other program modules 736, and program data 737 in the system memory 730. Operating system 744, application programs 745, other program modules 746, and program data 747 are given different numbers here to illustrate that, at a minimum, they are different copies. A developer may enter commands and information into the computing device 710 through input devices such as a keyboard/touch screen 762 and microphone 761. Other input devices (not shown) may include a joystick, game pad, satellite dish, scanner, or the like. These and other input devices are often connected to the processing unit 720 through a developer input interface 760 that is coupled to the system bus, but may be connected by other interface and bus structures, such as a parallel port, game port or a universal serial bus (USB). A display/monitor 791 is also connected to the system bus 721 via an interface, such as a video interface 790. Other peripheral output devices such as an audio output 797 may be connected through an output peripheral interface 795.

The computing device 710 may operate in a networked environment using logical connections to one or more remote computing devices, such as a remote computing device 780. The remote computing device 780 may be another mobile device, a personal computer, a server, a router, a network PC, a peer device or other common network node, and typically includes many or all of the elements described above relative to the computing device 710. Such networking environments are commonplace in offices, enterprise-wide computer networks, intranets and the Internet.

When used in a networking environment, the computing device 710 is connected to another network through a network interface or adapter 770. In a networked environment, program modules depicted relative to the computing device 710, or portions thereof, may be stored in the remote memory storage device. For example, remote application programs 785 can reside on memory device 781. The network connections shown are exemplary and other means of establishing a communications link between the computing devices may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A processor-implemented method executed by one or more servers for managing a terminal which has a network communication capability, comprising:

receiving registration information from a developer, via a computer of the developer, for registering as a software developer to develop applications for the terminal, the registration information comprises a developer identifier and developer authentication information and indicates which of one or more permissions of a plurality of available permissions the developer has registered for;

sending data to the developer's computer which indicates that the developer has been authenticated by the one or more servers, the developer's computer provides the data to the terminal;

receiving from client software running on the terminal, a request to unlock the terminal from a locked state to an unlocked state, the request comprises the data and an identifier of the terminal; and based on the request and the registration information, determining whether unlocking of the terminal is authorized, and if the unlocking of the terminal is authorized, sending a command to the terminal, the command comprising unlock data which is used by the terminal to persist an unlocked state in the terminal, the command indicates the one or more permissions the developer has registered for, the one or more permissions are enforced by the terminal in response to the command and the unlocked state allows one or more unsigned applications which were developed by a software development tool which runs on the developer's computer to be executed on the terminal.

2. The processor-implemented method of claim 1, wherein:
the registration information comprises a provision regarding a maximum allowable number of unlocked terminals which can be registered to the developer; and
the unlocking of the terminal is authorized contingent upon the unlocking not violating the provision.

3. The processor-implemented method of claim 1, wherein:
the command comprises expiration data which is used by the terminal to persist the unlocked state in the terminal for a time period defined by the expiration data; and
the unlocked state allows the one or more unsigned applications to be executed on the terminal until an expiration of the time period.

4. The processor-implemented method of claim 3, further comprising:
receiving from the terminal the identifier of the terminal at an end of the time period;
identifying an account of the developer based on the identifier;
determining whether the account of the developer has been renewed; and
in response to the determining, sending a command to the terminal to persist the unlocked state when the account has been renewed, or sending a command to the terminal to persist a locked state when the account has not been renewed.

5. The processor-implemented method of claim 3, further comprising:
receiving from the terminal the identifier of the terminal before an end of the time period;
identifying an account of the developer based on the identifier;
determining whether the account of the developer has been revoked; and
in response to the determining, sending a command to the terminal to persist the unlocked state when the account has not been revoked, or sending a command to the terminal to persist a locked state when the account has been revoked.

6. The processor-implemented method of claim 3, wherein:
the registration information comprises a provision regarding an application-specific expiration date for the one or more unsigned applications, the application-specific expiration date is enforced in addition to the time period in which the terminal persists the unlocked state.

7. A terminal which has a network communication capability, comprising:
at least one tangible non-volatile storage medium which stores client software; and at least one processor which executes the client software to:
receive a communication from an instance of a software development tool at a developer's computer via a wired or wireless link, the communication comprises data which indicates that a developer of the instance of the software development tool has been authenticated by one or more servers,
in response to the communication, send a request to unlock the terminal to the one or more servers, the request comprises the data and an identifier of the terminal and indicates which of one or more permissions of a plurality of available permissions the developer has registered for;
receive back from the one or more servers a command to unlock the terminal, the command comprising unlock data and indicating the one or more permissions the developer has registered for, and the one or more permissions are enforced by the terminal in response to the command,
use the unlock data to set an unlocked state in the terminal, and
in response to the unlocked state being set, copy and install an unsigned binary file from the instance of the software development tool.

8. The terminal of claim 7, wherein:
the command comprises a license file or a persistent token which is stored to persist the unlocked state.

9. The terminal of claim 7, wherein:
the unlocked state allows one or more unsigned applications which are developed by another instance of the software development tool to be executed on the terminal.

10. The terminal of claim 7, wherein:
the unlocked state is persisted independently of the developer's computer so that the unlocked state allows one or more unsigned applications to be executed on the terminal from different instances of the software development tool which run on different developer's computers.

11. The terminal of claim 7, wherein:
the unlocked state is persisted independently of the developer so that the unlocked state allows one or more unsigned applications to be executed on the terminal from different developers of the software development tool.

12. The terminal of claim 7, wherein the command identifies a time period to persist the unlocked state, and the at least one processor:
sends the identifier of the terminal to the one or more servers, the one or more servers identify an account of the developer based on the identifier of the terminal, and determines a status of the account; and
receives an instruction to persist the unlocked state or a locked state based the status of the account.

13. The terminal of claim 7, wherein:
the command comprises expiration data; and
the at least one processor persists the unlocked state until an expiration of a time period defined by the expiration data, after which a locked state is persisted, the locked state does not allow unsigned binary files from the instance of the software development tool to execute.

14. A tangible computer readable storage device comprising computer readable software embodied thereon for programming at least one processor to perform a method for accessing a terminal which has a network communication capability, the method comprising:
providing a user interface for receiving registration information from a developer, the registration information comprises a developer identifier and developer authentication information and indicates which of one or more permissions of a plurality of available permissions the developer has registered for;
sending the registration information to one or more servers, in response to which the one or more servers registers the developer as a software developer to develop one or more applications for the terminal using at least one instance of a software development tool;
receiving data from the one or more servers which indicates that the developer has been authenticated by the one or more servers;
sending the data to the terminal via a communication link with the terminal, in response to which the terminal communicates with the one or more servers using the data and an identifier of the terminal to receive a command to unlock the terminal, the command indicates the one or more permissions the developer has registered for, and the one or more permissions are enforced by the terminal in response to the command;

determining that the terminal has been unlocked; and in response to the determining, deploying one or more unsigned applications on the terminal which were developed by the at least one instance of the software development tool.

15. The tangible computer readable storage device of claim 14, wherein the terminal is unlocked during a specified time period, the method further comprising:

deploying unsigned applications on the terminal which were developed by the at least one instance of the software development tool, for a duration of the time period, without requiring the developer to again provide the developer authentication information.

16. The tangible computer readable storage device of claim 14, wherein:

the registration information from the developer indicates a maximum number of terminals which can be registered to the developer; and the user interface indicates how many terminals are currently registered, identifies terminals which are currently registered, and allows the developer to unregister one or more of the terminals which are currently registered, thereby allowing one or more additional terminals to be registered.

17. The tangible computer readable storage device of claim 14, wherein the user interface identifies the terminal and the method performed further comprises:

receiving a command from the developer which selects the terminal; and in response to the developer selecting the terminal, and without further input from the developer, the developer's computer sends the data to the terminal, and the terminal automatically communicates with the one or more servers to receive the command to unlock the terminal.

* * * * *